United States Patent
Shell et al.

(10) Patent No.: US 10,583,511 B2
(45) Date of Patent: Mar. 10, 2020

(54) CONNECTIONS FOR ISOLATED PHASE BUS ENCLOSURE

(71) Applicants: Chad Shell, Liberty Township, OH (US); Bruce Hack, Yonkers, NY (US)

(72) Inventors: Chad Shell, Liberty Township, OH (US); Bruce Hack, Yonkers, NY (US)

(73) Assignee: Crown Electric Engineering & Manufacturing LLC, Middletown, OH (US)

( * ) Notice: Subject to any disclaimer, the term of this patent is extended or adjusted under 35 U.S.C. 154(b) by 886 days.

(21) Appl. No.: 14/277,840

(22) Filed: May 15, 2014

(65) Prior Publication Data

US 2015/0330540 A1    Nov. 19, 2015

(51) Int. Cl.
*F16L 13/02* (2006.01)
*B23K 9/035* (2006.01)
*B23K 9/028* (2006.01)

(52) U.S. Cl.
CPC .......... *B23K 9/0358* (2013.01); *B23K 9/0286* (2013.01); *F16L 13/0209* (2013.01); *F16L 13/0218* (2013.01); *F16L 13/02* (2013.01)

(58) Field of Classification Search
CPC ... F16L 13/0209; F16L 13/0219; F16L 13/02; F16L 13/0218
USPC ........ 285/288.11, 374, 399, 422, 424, 123.3, 285/123.4, 123.6, 123.9, 123.13
See application file for complete search history.

(56) References Cited

U.S. PATENT DOCUMENTS

| | | | | |
|---|---|---|---|---|
| 1,661,674 A | * | 3/1928 | Osborn ................. | F16L 37/084 285/319 |
| 1,703,037 A | * | 2/1929 | Heck ...................... | F16L 13/04 219/137 R |
| 1,872,271 A | * | 8/1932 | Furrer ................. | F16L 13/0209 219/137 R |
| 1,903,315 A | * | 4/1933 | Priebe ................. | F16L 13/0209 219/61 |
| 1,912,993 A | * | 6/1933 | Murray, Jr. ............ | B23K 9/035 219/104 |
| 2,037,962 A | * | 4/1936 | Brown ................ | F16L 13/0209 285/22 |
| 2,548,566 A | * | 4/1951 | Stafford ................. | H02G 5/061 174/84 S |

(Continued)

*Primary Examiner* — Anna M Momper
*Assistant Examiner* — Fannie C Kee
(74) *Attorney, Agent, or Firm* — Andrew S. Langsam; Pryor Cashman LLP

(57) ABSTRACT

An end product and system for connecting large aluminum tubular pipe segments into an Isolated Phase Bus comprising reducing the diameter (or increasing the same) of one end of a tubular segment and sliding it into (or over) the untreated end of an adjacent pipe or tubular segment, followed by a tubular and circumferential welding of the same. The outside or inside circumference of the connected segments are uniform from distal to proximal end of the overall length of the connected tubular segments. A structural integral, axially aligned, simplified set of connectable tubular segments allows for a grounded connection between power generators and step transformers. Preferably, the overall diameter change of the necked down flange (or outwardly flared flange) of one tubular segment is less than or only slightly greater than twice the material wall thickness of the tubular segment's initial pre-rolled flat aluminum sheet material.

3 Claims, 4 Drawing Sheets

(56) References Cited

U.S. PATENT DOCUMENTS

| | | | | |
|---|---|---|---|---|
| 2,650,114 A | * | 8/1953 | Epstein | F16L 37/02 |
| | | | | 285/304 |
| 2,861,119 A | * | 11/1958 | Collonge | H02G 5/10 |
| | | | | 174/16.2 |
| 3,243,502 A | * | 3/1966 | Turgeon | H02G 5/061 |
| | | | | 174/99 B |
| 3,598,898 A | * | 8/1971 | Turgeon | H02G 5/061 |
| | | | | 174/68.3 |
| 3,708,867 A | * | 1/1973 | Meserole | F16L 9/06 |
| | | | | 285/424 |
| 3,758,139 A | * | 9/1973 | Meserole | F16L 9/06 |
| | | | | 285/332 |
| 5,909,904 A | * | 6/1999 | Shea | F16L 23/06 |
| | | | | 285/397 |
| 2005/0052024 A1 | * | 3/2005 | Herrington | F16L 39/005 |
| | | | | 285/374 |
| 2010/0207380 A1 | * | 8/2010 | Venable | F16L 13/0263 |
| | | | | 285/55 |

* cited by examiner

CONNECTIONS FOR ISOLATED PHASE BUS ENCLOSURE

FIELD OF THE INVENTION

The present invention relates to a system, end product and method for joining large metal pipes for the containment and passage of electrical conductors to connect the bushing between a generator and a transformer while protecting the same in a grounded cylindrical housing. More specifically, the invention relates to a system, end product and method for either rolling an outwardly flared end (the female end) (with a perpendicular knee) on a first large cylindrical conduit which then easily slides over and mates to a smooth cylindrical end of an adjacent cylinder which has had no flange created on its end. Or, an inwardly tapered offset end (a male end) (with a perpendicular knee) is created on a first cylinder and mates to a smooth, not altered end of the wall of an adjacent cylinder. According to the present invention, either a flared outward female end is created which mates with an unmodified circular end of a cylinder to create a joint and mating of two cylindrical sections or an inwardly tapered, flared and necked down diameter of a first wall of the cylinder is created which slides within the unmodified circular end of an adjacent wall of a cylinder. In either configuration, a cooperating and mating, pinching down or flared outward flange is created on the outer edge of a first cylindrical pipe segment which mates with the smooth wall of an unmodified cylinder to create, when connected together, a smooth set of cylinders, where the connection is uniform, supported by substantial surface area, where with the longitudinal axis is simply and substantially aligned by virtue of the process thereby inherently having its own self-created "welding backing. Then, a continuous perimeter weld will create an end product of required length of cylinders which are precisely axially aligned, rotationally aligned and with excellent strength at the welding locations. The process is more time efficient, produces a better quality outcome and allows for additional manufacturing implementations which will compress the total project's lead time.

BACKGROUND OF THE INVENTION AND DISCLOSURE

In large electric generating stations, the generator is the mechanism or machine that most likely converts (various forms of input energy) water, oil, nuclear or other mechanical energy to deliverable electrical energy. That energy is intended to be ultimately converted and transported to consumers (factories, substations, businesses, buildings, residential home consumers, etc.). Before being transmitted, the electrical energy of the generator is first passed to a step-up transformer. Usually, the safe, rugged connection between the generator and the step-up transformer is known as the Isolated Phase Bus (also known as "Iso Phase Bus," or "IPB"). Isolated Phase Bus is a custom designed electrical pathway carrying very high amperage (the output production of the generator) and safely delivers it to a large step-up (step up in terms of voltage and down in terms of amperage) transformer, usually located in the power plant's adjoining switchyard. That transformer "re-packages" the electrical power (by stepping up the voltage and thereby commensurately lowering the amperage) to be delivered to a myriad of distribution substations for ultimate delivery to customers throughout the servicing area.

The Iso Phase Bus gains and retains its robustness by performing three important functions. It separates each of the three (3) phases of electrical power into their own mechanically ridged conducting paths; it safely protects that ridged conducting path with a surrounding, electrically grounded rigid metal enclosure; and it separates each of those three grounded metal enclosures with an air gap for further electrical isolation from electrical faults.

From a mechanical and visual perspective, an Iso Phase Bus is a high conduction, thick-walled metal "pipe" (called the conductor) within a larger diameter, yet thinner walled outer "pipe" (called the enclosure). As both the conductor and enclosures are preferably cylinders, long and tubular, the term "pipe" is generically and visually appropriate; however, unlike a traditional pipe, the conductor and enclosure are not configured to convey water, other fluids, or gases. Both the conductor and enclosure are preferably manufactured from high conductivity aluminum. Engineering constraints require that both conductor and enclosure must be able to properly handle the same amount of current, and therefore the center conductor pipe—which has a relatively smaller diameter—will preferably have a thicker material wall dimension (preferably around ½" thick), while the outer thinner walled enclosure—which has a larger pipe-like diameter—can mathematically have the same amount of total metallic material per unit length yet with a thinner wall thickness (preferably around ¼"). The conductor is preferably held in the center of the enclosure by rigidly mounting a non-conducting "stand-off" insulator inside the cylindrical enclosure that allows and maintains the conductor to sit on top of the insulators in the center of the enclosure. Some manufacturers use two or three concentric, ring-like insulator designs to hold the conductor in a substantially centered position within the enclosure.

Throughout the industry, the overall length from generator to step-up transformer (of ¼" thick, outer aluminum cylindrical-enclosures) is developed by fabricating numerous segments, each up to but not longer than about 6 feet in length. Then coupling theses numerous segments together end to end via welding. Generally two opposing edges of these pipe-like segments are held end to end and one or more bands (a/k/a—weld backing strips) are placed across the interior or exterior of this "butted together joint." Initial tack welding of the interior or exterior "weld backing strip(s)" holds these pieces and/or adjacent sections together.

The reason for this 6' segmented length of end to end couplings to create the overall length of piping from generator to step-up transformer is due to the methodology of the sheet metals fabrication process and dimensional limitations of over-the-road transportation systems. Aluminum is generally produced into large ingots (or shapes suitable for further processing) in smelting mills. To make a useful end product—one of the next steps is for those large ingots to be conveyed to rolling mills where they are then rolled into long, flat, ribbons of material of ever-decreasing thicknesses and corresponding increasing in width and length (as the volume stays the same). For material thicknesses preferably ranging from very thin up to approximately ½" of thickness, the flat, planar, ribbon-like material comes down a long line in the rolling mill and is then coiled onto an appropriately sized center tube (think aluminum foil). As a direct consequence of the maximum widths for trucks on the US highways, it is current industry practice to make these rolls or sheets of aluminum, up to, but usually not much bigger than, 2 meters wide. Therefore using manufacturers of the above mentioned "rolls or sheets of aluminum" are generally working with a maximum width of approximately six (6) feet. Aluminum can be pulled off of the roll for any desired length, but the material's thickness has been fixed by the rolling process and that width has been fixed to be no greater than approximately 6 feet—again due to transportation and handling limits.

Taking a length of flat sheet aluminum material off of the transported aluminum coil and rolling that piece into a tube will produce a section with the mathematical diameter of said tube being the well-known circumference of the flat sheet's length (the dimension entering the rolling machine)—divided by Pi (3.14 . . . ). That means that if the aluminum coming off the roll is preliminarily fixed in its width dimension at six (6) feet wide (due to the road restrictions of wide trucks) the largest diameter tube which can be made from the 6 foot dimension is just under 23 inches (6 feet divided by 3.14 . . . =22.9 . . . inches). Generally, outer enclosures of Iso Phase Bus have preferred diameters being substantially larger in diameter than 23 inches. This can then be accomplished with a sheet unrolled from the aluminum coil which is longer than the 6 feet width of said aluminum coil. The properly engineered prescribed length requires the sheet that is to be unrolled from the aluminum coil to be calculated by multiplying the final desired diameter for the enclosure cylinder section by Pi. (ex—a section requiring a four foot diameter (48 inches) requires a length of uncoiled sheet of aluminum to be (48 inches×3.1417 . . . =) or about 150.80 inches. Iso Phase Bus fabricators therefore make enclosure sections with diameter dimensions as necessary by uncoiling sheets from the 6 foot wide roll at properly engineered, prescribed desired lengths. However, since the planar material is coming from a 6 foot wide coil of aluminum, the maximum length of the tubular enclosure after it is rolled will be no longer than the 6 foot which was the width of the aluminum coil.

An electrical generator and its associated step-up voltage transformer are generally over a hundred feet apart. This requires the three separate phases of Iso Phase Bus "pipes" or cylinders of aluminum enclosures to be possibly hundreds of feet long. These custom lengths are fabricated by taking the above mentioned six-foot tubular segments and butting them end to end together, one after another. These "butt joints" can then be solidly welded together, continuously around their entire mating circular perimeters. Generally, this welding together process can be done in one of two ways, described in more detail below. Butt joint welding of aluminum Iso phase or tubular section after section, eventually creates a single, lengthy, and continuous pipe of sufficient length which follows the proscribed path from Generator to Step-up Transformer and any associated tap-off points.

The methods currently used in the art for joining adjacent tubing sections using "butt joints" at the circular edges allow the two pipes to rotate and "wiggle" somewhat during the connection process. This is unavoidable and undesirable. This rotation and wiggling means that the two sections are not precisely maintaining their alignment during the butt welding process such that they are not axially and circumferentially aligned and true as desired. The alignment of the longitudinal axis of one pipe or tubular cylinder to the adjacent tubular cylinder is highly desirable in IPBs. It is a key characteristic that is vital for IPB fabrication and in field erection. Therefore, today, using conventional butt welding, unnecessary energies must be allotted to ensure straightness is maintained when adjoining sections via butt welding/joining and, in any event, the longitudinal axial alignment is not as precise as desired. Generally, the butt welding is done by using internal or external, originally separate, backing strips which encircle the outside of the adjoining or abutting edges of the two pipe segments or are wrapped into the inside of the adjacent pipe-like segments. These are intended to wrap around (or inside of) the seam between the tubular sections to be welded together and, then, the backing strips welded to the outside (or inside where internal backing strips are employed) of the surface of the cylinders.

The present invention discloses a system, end product and method for rolling metal into large cylinders, as an enclosure for Iso Phase Bus, wherein lengths of the tubular sections can be easily and efficiently adjoined, all while maintaining axial alignment, then welded together. One end of a single tubular or cylinder section will be provided with either a "flare out" or a "stepped in" flange. The other end left without change of diameter. Then, the flare out of one end of a first tubular or cylinder section will be slid over the untreated end of a second tubular section. Alternatively, the inwardly tapered or flared inwardly end of a first end of a tubular section is slid within the untreated end of a second tubular section. The two ends (whether male or female of a first tubular section) cooperate and mate and provide a smooth outer wall for the length of the two cylinders when the same are slid into or over, respectively, the untreated end of a second tubular section. Then, the single seam can be welded together such that a length (of two or more) of the cylinders is created and the longitudinal axis of the multiple adjacent sections are precisely aligned. An enclosure is thus provided of any desired overall length with the seams between adjacent cylinders being welded with a single weld line and with the longitudinal axis being easily maintained and substantially aligned.

According to the present invention, a pinch rolling machine and/or jig or tool is used to "pinch" or taper diametrically inwardly (or a similar machine, jig or tool is used to outwardly flare) one end of each of a set of cylinders. The set of custom machining "pinch rollers" are used such that when properly pressured together, one end of the aluminum tube is rolled between them, smoothly enlarging (for the flared out end) or tapering or reducing the diameter of the end (for the inwardly pinched end or the stepped down end). The flared out end is intended to slide over the untreated end of a second cylinder until the inside shoulder of the flared out end butts against the untreated end or shoulder of an adjacent tubular section. In the other embodiment, the inwardly pinched down or inwardly tapered end, it is slid within the smooth untreated end of the wall of the adjacent second cylinder until the outside shoulder of the inwardly tapered end contacts with the edge of the untreated end of the second cylinder. In either configuration, then, a smooth inside wall of the two cylinders is presented (with the flared out configuration) or a smooth outside wall is provided (where the end of a cylinder is inwardly tapered or necked down and slid within an untreated cylindrical end of the second tube. A single line of welding joining the two segments together is presented. The two cylinders are secured together by the welding and the structure, rigidity and alignment of central longitudinal axis further maintained by the slight overlap of the outside, outwardly flared pipe of one section on the untreated end of a second pipe section or the inwardly stepped in or tapered pipe end of one section being slid within and maintained inside of the untreated end of the second tubular section. This system, end product and method "pinches" preferably approximately one to three inches (+/−) of one of the ends of the aluminum enclosure tubes. The amount of pressure put on the pinch rollers and the time allowed for the cylinder ends to remain within the rollers of the rolling machine is preferably set so that the amount of diameter outward expansion or tapering/flared reduction of the enclosure tube's ends are ever so slightly more than twice the general wall thickness of the tube itself (i.e. the thickness of the aluminum sheet used to create the tube). This amount of diameter change allows the modified end to tightly slide within or over the untreated adjoining section. This process thereby preferably creates a "self-backing" surface for an integral weld on the tube itself for the connection to the next enclosure tube.

Once this pinching in or out of one end of a first tubular section has been accomplished, a second tube—whose free end has not been pinched and rolled—can snugly slide over the pinched or tapered end. Of course, its distal end is provided with either a flared outwardly end or an inwardly pinched down end, or an untreated end, so that it will cooperate and mate with another cylinder. Only untreated ends of cylinders will not be butted together. In the preferred embodiment, all of the first ends of the cylinders for the length required from generator to step transformer are either flared outwardly or tapered inwardly with the other ends untreated. To thus create the proper length of butted together, axially aligned tubular sections, is efficient. Welding secures the pipe sections together, as required.

As stated above, this process self-creates its own welding backing surface and dually auto-aligns the two tubes with exceptional straightness i.e., longitudinal axis of the two tubes are aligned. Auto aligning is a byproduct of the un-flared or untreated tube end being forced against the well-formed "knee" or shoulder of the flared end of an adjacent tube or pipe segment. Using the system and method of the present invention, the end of a first pipe can be pinched either inwardly or flared outwardly from the original outer circumference of the pipe, thereby creating an internal inwardly confined or diameter-squeezed offset flange or an exterior, outwardly flared flange. By creating a flange, either internally or externally, the leading edge of the first pipe is uniformly altered so as to perfectly fit within or over the untreated interior or exterior surface, respectively, of a second pipe with its end having not having been pinched or flared. Thus, the two pipe segments can snugly fit with ends mating with one another, holding firmly in place for being then welded together. This method also increases the common surface area of the ends which are welded or connected. This presents a much-needed improvement to the prior art systems, which attempt to weld two pipes of the same outer circumference (with interior or exterior bands at the joint) which have their untreated ends butt up against one another thereby necessitating maintaining them in place during the welding process. Rather than the butting and welding of the two pipe segments with identical dimensions of their ends, as in the prior art, the present invention allows the pipe segments to easily and securely affix within one another to ensure uniform and proper welding of the same, together with substantially "automatic" axial alignment. This system and method can be used to longitudinally join an unlimited number of pipes, as each pipe can be provided with one pinched or stepped down diameter end or one outwardly flared end and one untreated end. These cylinders can be easily and quickly assembled to provide the length of enclosure required for IPB.

Thus, the present inventive system and method removes the need to create a backing band or bands (or overlying band(s)) for attaching one or more pipe sections/segments, and, also provides substantial auto alignment of two or more pipe segments. The present invention reduces the time to join sections and holds the sections in their proper respective positions so as to allow for quick, efficient and secure welding of the segments together. The present invention offers a superior electrical conduit as there is more surface area contact of actual pipe segment to pipe segment at the ends due to the snugness of the joint—formed by the mating of the cylinders and their formed ends.

DESCRIPTION OF PRIOR ART

Currently, the manufacturers of Iso Phase Bus utilize one of two variations on the same process to create these long "butt welded" pipes. In the first process, a full strip of aluminum (with preferably a similar thickness to the material used for the enclosure) is tack-welded to the inside edge of one of the ends of the enclosure tubular segments or "cans" in such a way as to allow a few inches of the width of the strip to be spot welded to the inside edge of the can and with a few inches of width of the strip sticking out past the end of this first tubular segment or can. The second enclosure pipe segment is then slipped over the outside circumference of this inner welding/support strip to form a single joint with an aluminum "backing" strip that can be fully and continuously welded around the perimeter. Once welded, this forms a set of tubes of length equivalent to two pipe segments.

In the second process, two enclosure sections or tubular segments are butted up, edge to edge, to each other and two half-perimeter strips of aluminum (similar dimensionally and in thickness to the interior backing strip, described above but having greater inside and outside diameter) are laid over the small gap of the formed butt joint. The strips are then welded on both sides (i.e., to each of the pipe segments) and the two sections, after welding, form a single, longer overall length than either section by itself. This outer strip design generally extends over half the circumference of the pipe segments of the enclosure so that the strips are welded on both of their outer edges to the outer wall of the pipe segments. These strips (either inner or outer of the butted together two pipe-like segments) are required because the butt joint itself cannot be welded with the required degree of structural integrity. Any attempt to do so would likely burn through the butt joint gap and damage the two tube sections as well as splatter aluminum throughout the area. The inner or outer backing(s) strips provide the proper welding contact surface for the outer or inner surfaces of the pipe or tubular or cylindrical segments so as to be able to make a somewhat continuous, quality, structurally integral, perimeter weld.

The present invention discloses a system and method that negates the need for a separate welding or backing strip to be fabricated and introduced into this joint welding process. The system, end product and method of the present invention provides an inwardly necking down or pinching in on one end of a first pipe to uniformly and comfortably fit within the untreated circular circumference or end of a second pipe for connection of the same without risk of the two pipe segments not being perfectly adjoined. Alternatively, the leading end of a first pipe segment is outwardly flared to slide over the untreated end of the second pipe. In either configuration of the present invention, one end of the pipe is treated (flared outwardly or necked down inwardly) to mate with (slide over or within, respectively) the untreated end of a second pipe. Of course, the other end of the second pipe will either have a necked down end or a flared outward end, so that it will/can couple to the untreated end of yet another pipe segment. This process has a number of advantages including increased efficiency, speed in fabrication, reduction in "fitting and alignment" labor, and improvements in overall axial and rotational alignment of the sections. Increased surface area beneath the welding seam is also provided which results in additional mechanical strength.

SUMMARY OF THE INVENTION

The present invention discloses a product, a system and method for joining large, high conduction, moderate-walled metal pipe segments, tubes or cylindrical segments, called the conductor and the enclosure, to connect a generator and its associated step-up transformer. The present invention provides substantial auto alignment of two or more enclosure sections and holds the sections in their proper respective positions so as to easily, quickly, efficiently and accurately weld them together, thereby providing a superior mechanical connection between the pipe segments. The increase in surface area of the adjacent pipes (beneath the welding seam) where the ends come into contact with one another leads to improved structural and electrical integrity. The system and method of the present invention is advantageous because it preferably eliminates the need currently in the art for a separate welding strip(s) to be fabricated and introduced into this joint welding process, and merely requires a simple rolling step of one end of the tubular metal which can either "flair out" or be tapered, i.e., "step in" at one end of an aluminum IPB enclosure tube. This can be accomplished with a simple set of rollers and suitable machinery. This process will allow for an inwardly pinched end of a first, otherwise cylindrical tube to slide within an untreated end of a second cylindrical tube and/or an outwardly flared end of a first tube to slide over the untreated end of a second tube. Thus, one end of each of the tubular or pipe-like segments is treated (necked down or tapered by inwardly pinching or outwardly flared) and the other end left untreated. The end of a second tubular segment which has not been pinched (neither flared inwardly nor outwardly) snugly slides over or within the treated end of the first tubular segment, whether tapered in or outwardly flared, respectively. The adjacent pipe segments, as a consequence of the present invention, will auto-align, i.e., the longitudinal axis of the adjacent cylindrical segments will be aligned, as required and desired. This can be done for connection of an unlimited number of pipe segments, with each pipe being provided with one pinched end (outwardly or inwardly) and one non-pinched or untreated end. Using the method of the present invention, the pinching of pipe segments (whether the pinching is outwardly flaring or the pinching to provide an inwardly tapered or reduced neck area) is preferably all done uniformly to ensure that any one pipe segment with pinched end can secure to any other pipe segment of equivalent size and dimension having its connecting end untreated or non-pinched.

BRIEF DESCRIPTION OF THE DRAWINGS

FIG. 3B also shows the exterior shoulder of the end of the pipe segment;

FIG. 3F also shows the interior shoulder of the treated end of the pipe segment;

DETAILED DESCRIPTION OF THE DRAWINGS AND THE PREFERRED EMBODIMENT

Description will now be given of the invention with reference to the attached FIGS. 1A-3H. It should be understood that these drawings and figures are exemplary in nature and in no way serve to limit the scope of the invention as the invention will be defined by the claims, as interpreted by the Courts in an issued US Patent.

Figure 1C:
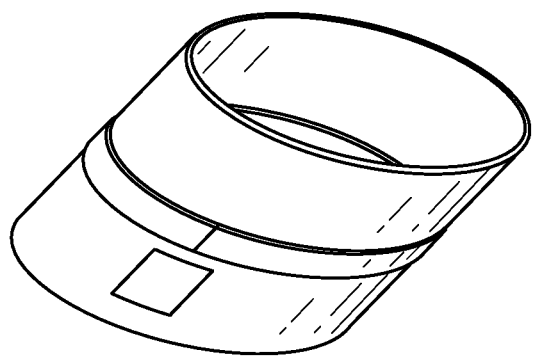
FIG. 1C shows the two pipe segments having been welded together in the prior art embodiment seen in FIGS. 1A and 1B, with the welding bands extending around the entire perimeter of both cans and showing exterior seams between the tubular segments and the exterior welding bands.
Figure 1B:
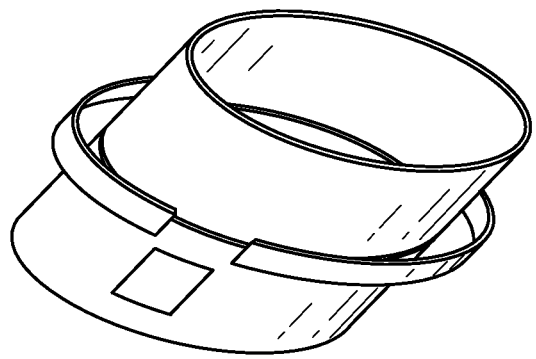
FIG. 1B shows the external welding bands of aluminum being placed around the two metal pipe segments in the prior art embodiment seen in FIG. 1A and demonstrates how tack welding of the bands to the exterior of the pipes is first accomplished.
Figure 1A:
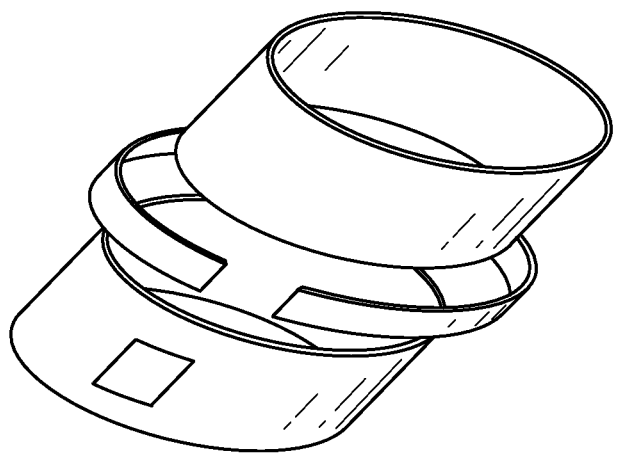
FIG. 1A is an exploded view of a first prior art system of aligning and welding a pair of conductor "cans" or pipe or tubular segments together using a pair of exterior welding bands encircling the edges of the tubular segments which are then welded to the exterior of the ends of the adjacent segments.

The prior art mechanism and system for connecting adjacent sections or open ended cans of aluminum into a long segment for connection between a power generator and a step transformer is set forth in FIGS. 1A, 1B and 1C. As can be seen, two identical pipe segments, cans, or tubular sections are aligned, end to free end and then a pair of semi-cylindrical welding bands placed over and around the adjoining edges. The inside of the welding strips are tack welded to the outside of the edges of the "cans" or tubular segments and a small length (in contrast to the circumferential dimension) of the dimension of the welding strips extends over and overlaps a small amount of the longitudinal length of the tubular segments. With the tack welding finished, the two circumferential seams of the welding strips are welded to the outside of the tubular segments to create a length (two segments end to end) of enclosure. The welding strips actually can be seen in FIG. 1C to be slightly greater in outside diameter than that of the tubular segments upon which they are placed so that the outside wall of the connected together tubular segments is not perfectly smooth.

Figure 2A:
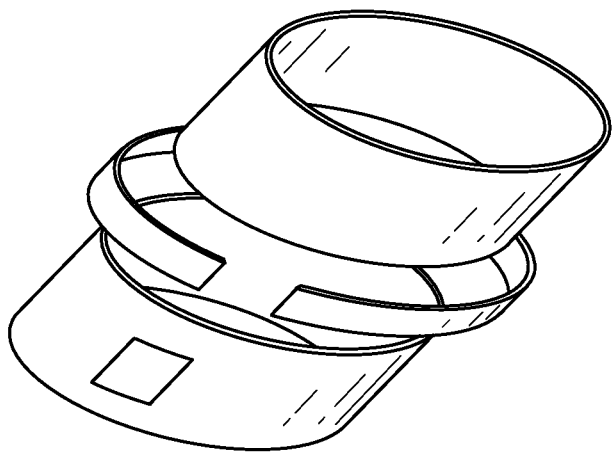
FIG. 2A is an exploded view of a second prior art system of aligning and welding a pair of pipes, tubular segments or conductors using a pair of interiorly located welding bands.
Figure 2B:
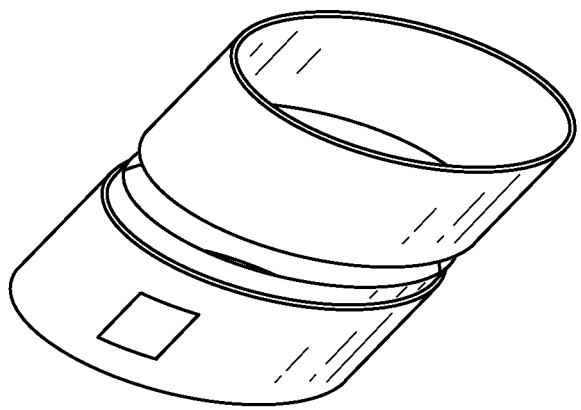
FIG. 2B shows the welding strips or bands of aluminum being connected to the inside end of a first metal pipe for sliding connection into the end of a second metal pipe in the prior art embodiment seen in FIG. 2A; the welding bands are tack welded to the first pipe and then, after the free end of the second pipe slid over the short exposed width of the bands, the bands are desirably tack welded to the inside of the second pipe segment.
Figure 2C:
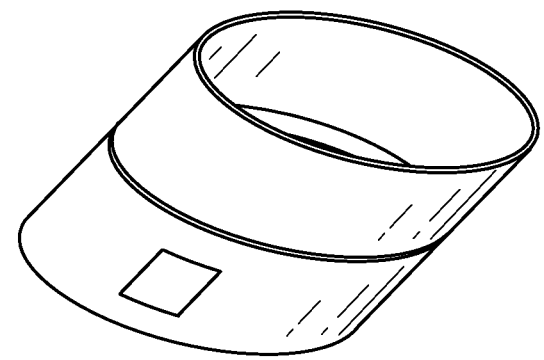
FIG. 2C shows the two pipe segments having been welded together.

FIGS. 2A, 2B and 2C, also show a prior art method of connecting tubular segments but, here, a pair of inside, semi-cylindrical welding strips are placed inside the ends of the adjacent tubular segments, spot welded therein and then, the entire outside perimeter of the interface or seam of the adjacent pipe segments welded together.

Figure 3A:
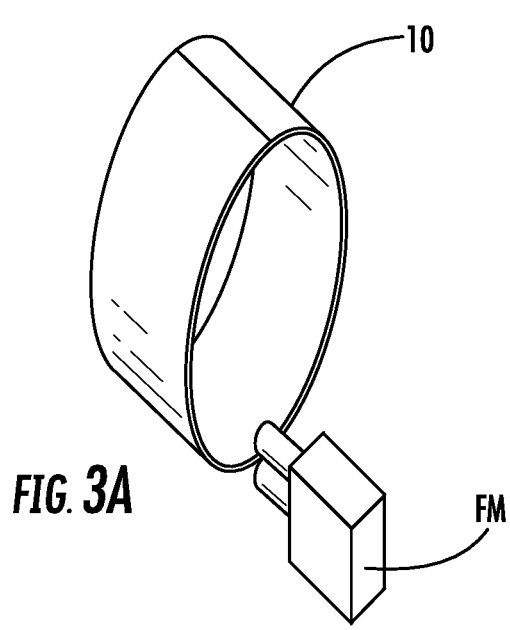
FIG. 3A is a front perspective view of a section of a tubular pipe segment, a "can" or a cylinder with a flaring mechanism for pinching or tapering inwardly the first and free end of the pipe segment and thereby creating an interior, diameter-reduced or offset flange of short longitudinal axial dimension with a shoulder for sliding connection into the untreated end of a second pipe using the system and method of the present invention.
Figure 3B:
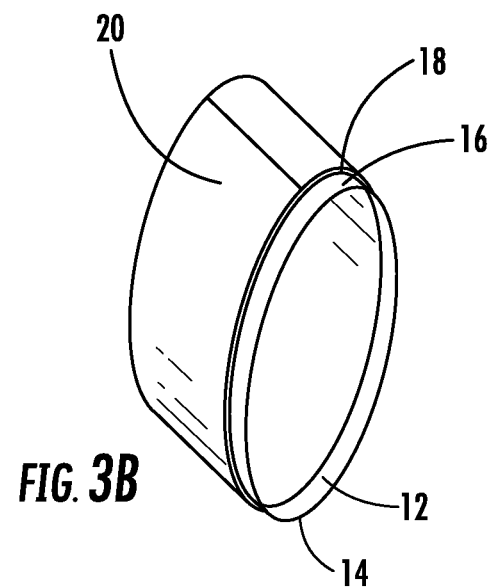
FIG. 3B is a front perspective view of a section of a tubular pipe segment shown in FIG. 3A, after the end has been provided with the inner, reduced in diameter, flange or inward tapering or flaring of the metal pipe created by using the system and method of the present invention shown in FIG. 3A.
Figure 3C:
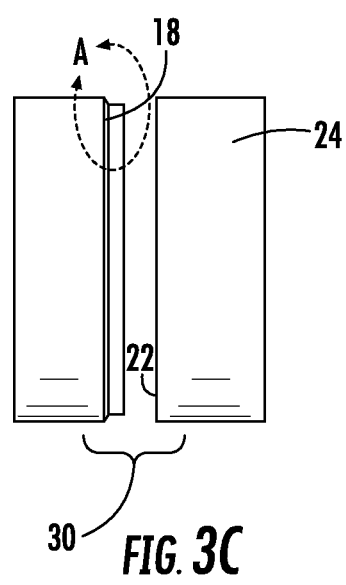
FIG. 3C is a side elevational view of the coupling or connection of the untreated or free end of a second pipe segment onto the interior, reduced in diameter flange of the first pipe segment, shown in FIG. 3B, with the untreated end sliding over the reduced flange end until the shoulder of the reduced-in-diameter end comes into butting contact with the circular edge of the free end of the second tubular segment; the two segments can then be welded along the seam around the complete circumference of the pipe segments, with the formed flange serving as a backing surface for the weld.
Figure 3D:
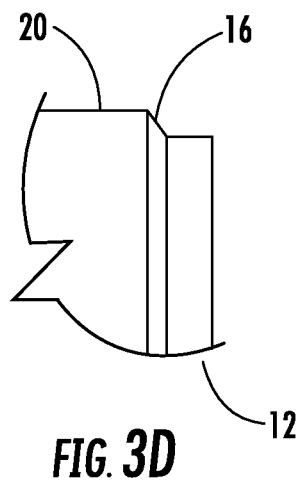
FIG. 3D is a close-up or enlarged partial, side view of the interior, necked down or diameter-reduced, offset flange of a first pipe segment as seen in FIG. 3B.
Figure 3E:
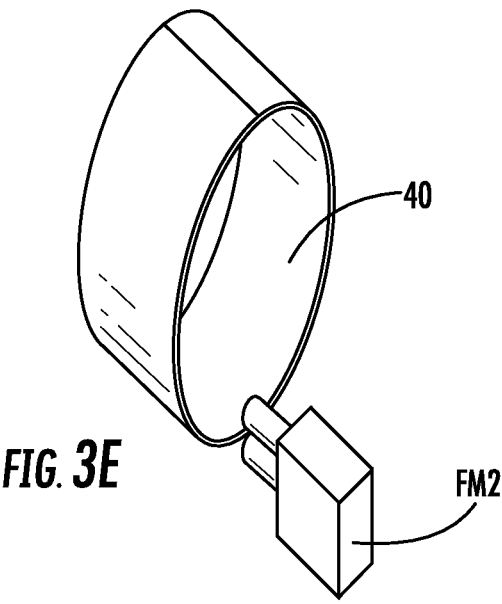
FIG. 3E is a front perspective view of a section of a tubular pipe segment, a "can" or a cylinder with a flaring mechanism for pinching and drawing outwardly the first and free end of the pipe segment and thereby creating an enlarged in diameter, outwardly flared flange of short longitudinal axial dimension with a shoulder for sliding connection into and abutting with the untreated end of a second pipe segment using the system and method of the present invention.

As seen in FIG. 3A, according to one embodiment of the present invention, one end of a first pipe segment 10 (sought to be joined to another pipe segment 24) is placed with its end or edge into a flaring machine (FM) or a jig intended to provide an inside or necked down or tapered flange 12 thereon. As can be seen in FIG. 3B, the necked down flange 12 has a leading edge 14, an outside circumferential wall 16 and a shoulder 18 extending substantially perpendicularly between the outside 20 of the pipe segment 10 and the necked down section or flange 12. FIG. 3D shows an alternate and preferred embodiment wherein the circumferential wall 16 does not extend fully perpendicularly to the outside circumferential wall 20 but, rather, shows a gradual taper, from outside 20 to the necked down flange 12. The perpendicular shoulder 18 (See FIG. 3D) is the point of contact with the circular end 22 of the untreated edge of the second tubular segment 24 (as seen in FIG. 3C). The taper shown in FIG. 3D facilitates the easy sliding of the second tubular segment 24 over the reduced in diameter flange up to the point that the shoulder 18 abuts against circular end 22 of second tubular segment 24. The taper also facilitates the process of manufacture and, by eliminating sharp angles, likely results in superior construction, i.e., more structural integrity.

Figure 3F:
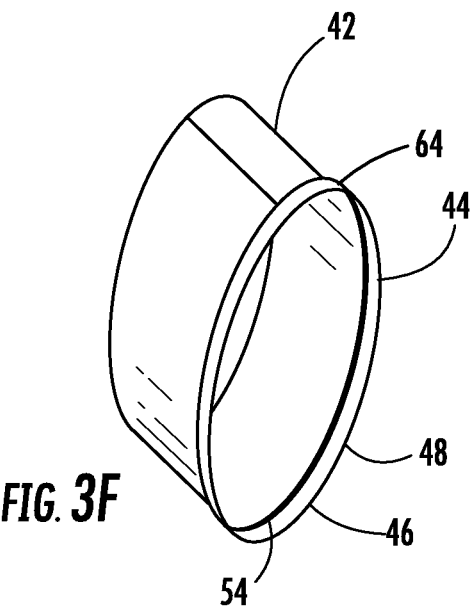
FIG. 3F is a front perspective view of a section of a tubular pipe segment shown in FIG. 3E, after the end has been provided with the outwardly flared flange created by using the system and method of the present invention shown in FIG. 3E.
Figure 3G:
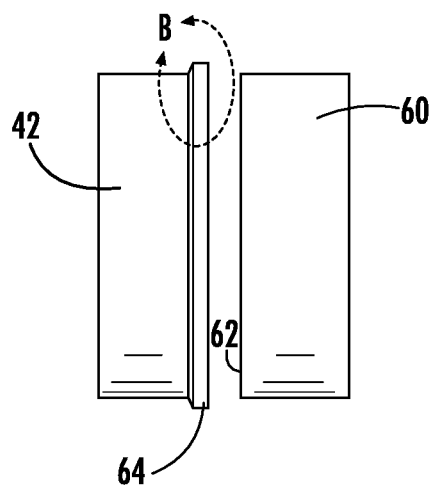
FIG. 3G is a side elevational view of the coupling or connection of the untreated or free end of a second pipe segment (on the right of the FIG.) slid into the outwardly flared or increased in diameter flange of the first pipe segment (on the left side of FIG. 3G) with the untreated end sliding within the enlarged flange end until the shoulder of the flange is engaged and comes into butting contact with the circular edge of the free end of the second tubular segment; the two segments can then be welded along the seam around the complete circumference of the pipe segments.
Figure 3H:
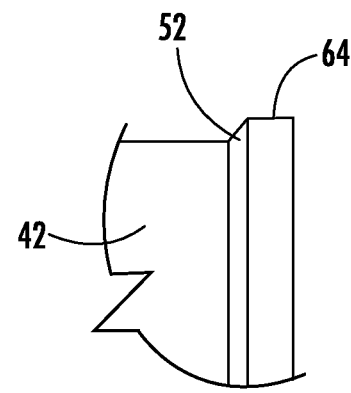
FIG. 3H is a close-up or enlarged partial, side view of the outwardly flared or increased in diameter flange of a first pipe segment as seen in FIG. 3F.

The necked down end of the first pipe segment shown in FIGS. 3B, 3C and 3D is intended to be slid into the untreated end of an adjacent pipe segment 24. Then, the full perimeter seam can be welded, between the circular end 22 of second pipe segment 24 and the shoulder 18 of the first pipe segment 20. This will result in a strong, axially aligned, length of pipe segments with excellent integrity, all made in a highly efficient manner. The flange of one segment is an integral backing strip for the weld, resulting in a superior surface are of weld and structural integrity. Of course, as mentioned, the other end of the pipe segment 24 (and, for that matter segment 20, too) are provided, as needed, with either a reduced in diameter end as shown in FIGS. 3B and 3C, 3D, or an untreated end (like tubular segment 24) or an enlarged in diameter outwardly flanged end as seen in FIGS. 3F, 3G and 3H. Preferably, one end of each segment is flared inwardly or outwardly and the other end untreated. The point is that only one end needs to be flanged inwardly (FIGS. 3B, 3C and 3D or flanged outwardly (FIGS. 3F, 3G and 3H) and the other end can be wholly untreated. In this manner, a long stretch of pipe segments can be laid, end to end, with the flanged ends either sliding into or over the untreated ends of adjacent segments to create a long and axially aligned length of tubular sections. Of course, the length of the flange 30 (See FIG. 3C), extending between shoulder 18 and free edge or circular wall or end 16 needs to be adequate such that some backing support is provided and axial alignment maintained, especially during the welding process. According to the preferred embodiment, the length of the flange's extension into the free or untreated end of the adjacent tubular section is enough to hold the two cans securely together and provide a backing to the seam joint.

According to the embodiment shown in FIGS. 3E through 3H, a free end of a third tubular section 40 is brought into working contact with the outwardly Flaring Machine FM2 which will cause the end to have an outward in diameter flare. As seen in FIG. 3F, the outside wall 42 is provided, at its end 44, with an outwardly flared or increased in diameter end 46. The flared end 46 comprises a circular edge 48, an outside, circumferentially extending along a short longitudinal distance, flare wall 64, and an outwardly tapered connecting wall 52 (See FIG. 3H). A shoulder 54 on the inside of the flared head end will, when a second pipe segment 60 is slid within the flared end, have its edge 62 (see FIG. 3G) abut against and in contact with the shoulder 54. When the second pipe segment 60 is slid into and abuts the shoulder 54 of the first pipe segment 40, the two segments 40 and 60 are welded about the entire circumference of the seam to provide a secure, axially aligned and strong length of pipe segments. The seam is defined as the edge 64 of the flared out section and the outside of the second tubular pipe segment 60. The wall of the flange serves as a backing wall for the seam. Of course, the other end of the second pipe segment 60 can either be and is preferably untreated, provided with a flange as shown in FIGS. 3B, 3C and 3D or as that shown in FIGS. 3F, 3G and 3H. The important point, however, is to provide multiple lengths of pipe segments which can be laid, end to end, one flange either sliding within the free end of an adjacent pipe segment or over the adjacent pipe segment, with the seams then being welded from the outside. Here, too, the length of the extension of the wall 64 (FIG. 3H) from shoulder 54 to edge 48 is just slightly greater than the thickness of the pipe. As can be seen in FIG. 3H, an outwardly flared or outwardly tapered flange wall can be provided from outside wall 42 to wall 64 or, alternatively but not as preferred, the wall can be perpendicular to the longitudinal axis of the pipe segment. It has been found that a tapered wall between the shoulder and the free end 48 is structurally superior and, in addition, is easier to be manufactured without defects.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed but that the invention will include all embodiments falling within the scope of the claims.

We claim:

1. An enclosure of an isolated phase bus comprising:
   at least two connectable, thin-walled, aluminum tubular segments, each tubular segment having two open ends at opposite sides of a longitudinal axis of said tubular segment,
   wherein the enclosure is engaged with a conductor disposed in an interior portion of the enclosure via an insulator connected to both the enclosure and the conductor,
   wherein a first open end of a first tubular segment of the at least two tubular segments has a forwardly projecting flange element, each tubular segment having the same outside surface diameter along a substantial length except as to a short length of said flange element of said first tubular segment, said flange element being formed and necked down from the outside surface diameter of said first tubular segment to a slightly smaller diameter than the outside surface diameter of said first tubular segment, said flange element including a connecting shoulder directed inwardly from the outside surface diameter of said first tubular segment and a slightly forwardly extending segment coaxial with a longitudinal axis of said first tubular segment,
   wherein a second open end of said first tubular segment, opposite to said first open end, defines a flat annular surface whose plane extends across said longitudinal axis of said first tubular segment, said annular surface facing away from said first open end and said flange element,
   wherein said flange element of said first tubular segment is configured to slide into a second open end of a second tubular segment of the at least two tubular segments, said second open end of said second tubular segment provided with a flat annular surface whose plane extends across a longitudinal axis of said second tubular segment, and said connecting shoulder of said first tubular segment is configured to engage and contact said annular surface of said second open end of said second tubular segment, and
   wherein a seam formed between said connecting shoulder of said first tubular segment engaging and contacting said annular surface of said second open end of said second tubular segment is welded with a weld, in which said flange element of said first tubular segment is a backing surface of the weld.

2. The enclosure of claim 1, wherein the at least two tubular segments are about ¼ inch in wall thickness.

3. The enclosure of claim 1, wherein said flange element extends from said first open end in an amount about equal to or only slightly greater than the wall thickness of the at least two tubular segments.

* * * * *